Sept. 4, 1962   S. LOMBARDO   3,052,177
BROILER
Filed Dec. 31, 1959   2 Sheets-Sheet 1
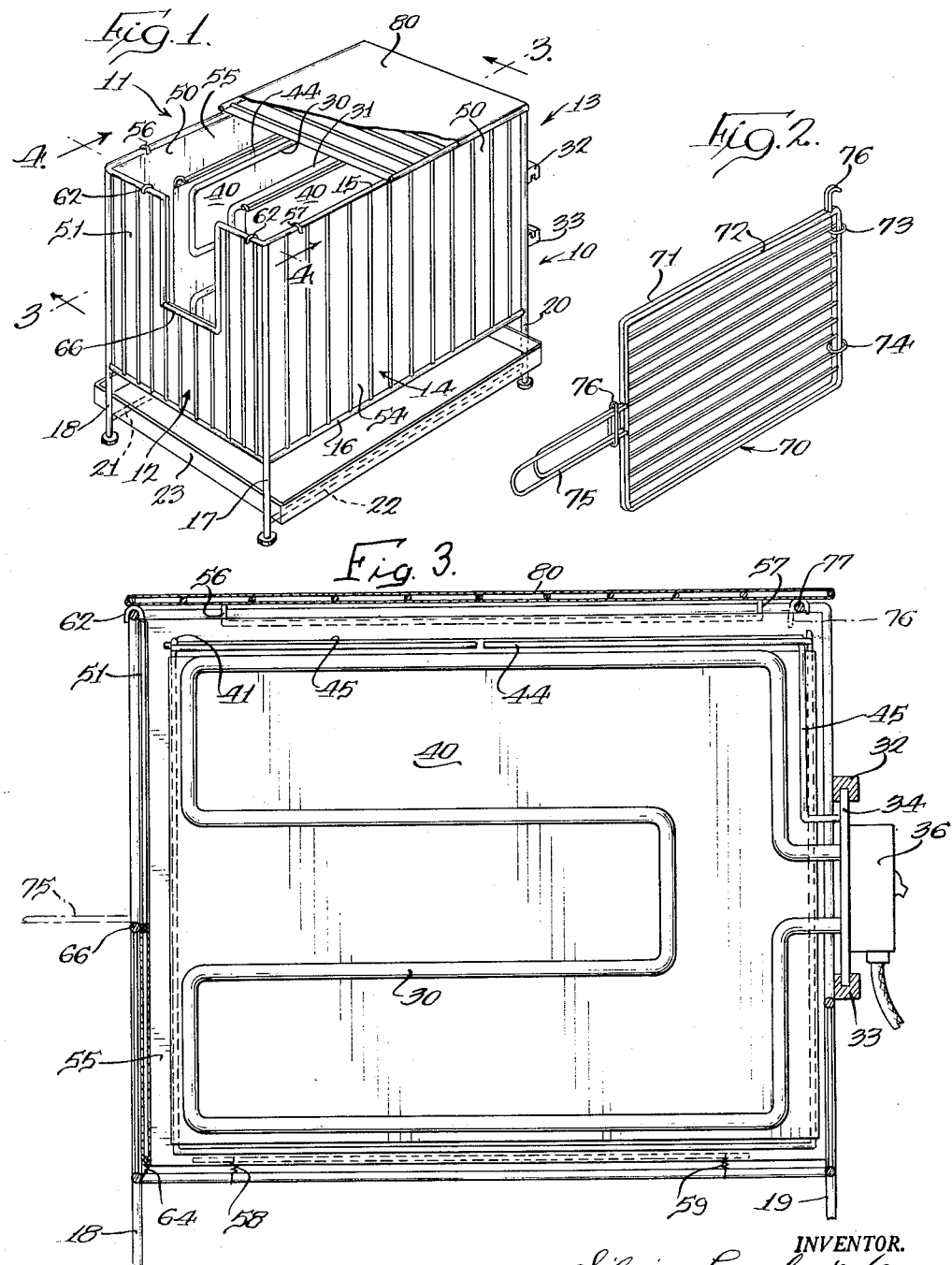
INVENTOR.
Silvio Lombardo
BY Hofgren, Brady,
Wegner, Allen & Stellman
Attys.

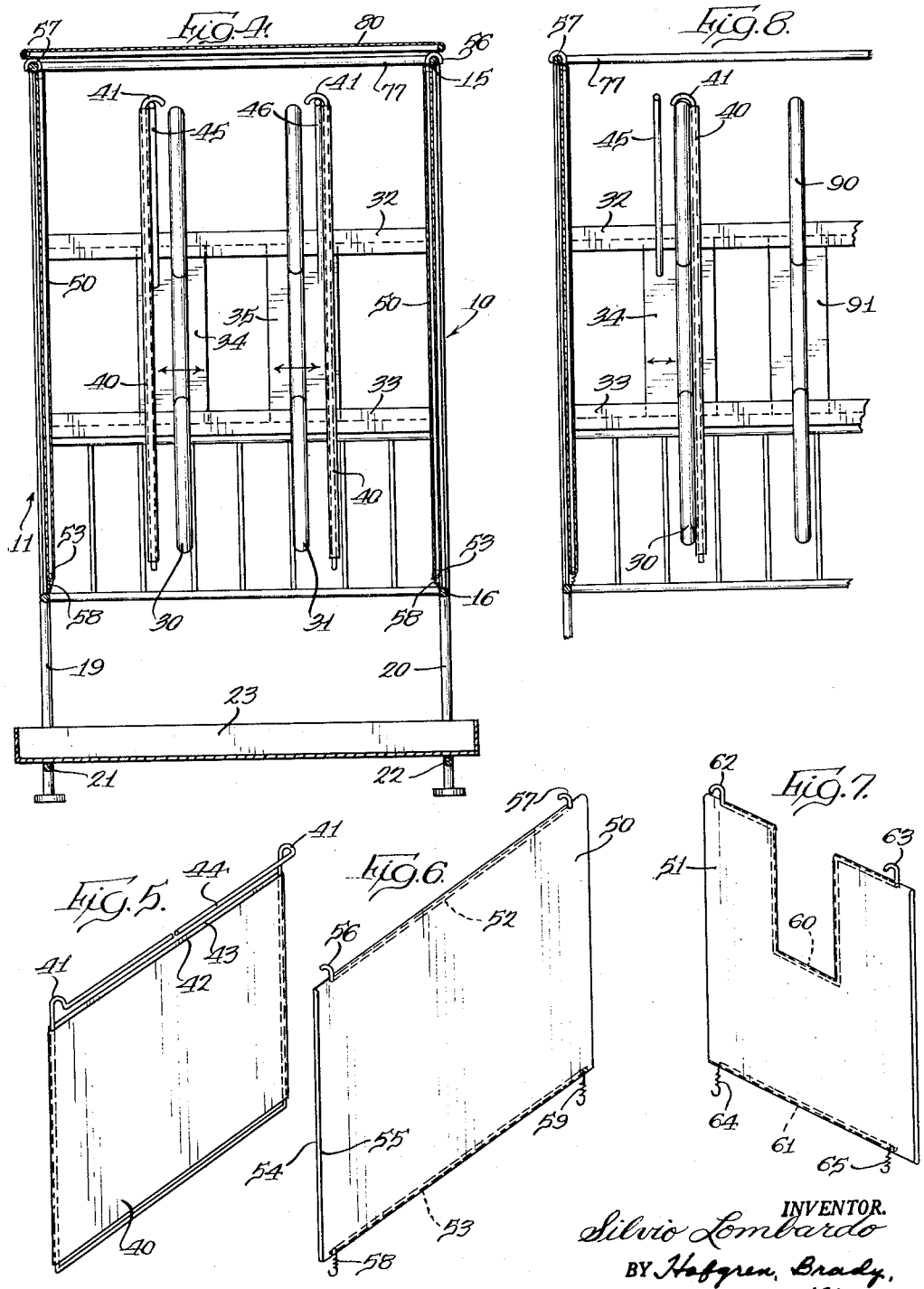

United States Patent Office 3,052,177
Patented Sept. 4, 1962

3,052,177
BROILER
Silvio Lombardo, Chicago, Ill.
(518 W. Santa Ana St., Fresno 5, Calif.)
Filed Dec. 31, 1959, Ser. No. 863,298
2 Claims. (Cl. 99—390)

This invention relates to a broiler and more particularly to a portable broiler of a simple low-cost construction which is simply and efficiently used, which requires very little cleaning and which gives off practically no smoke while broiling.

An object of this invention is to provide a new and improved broiler utilizing disposable foil material for heat reflection and insulation to provide a simple low-cost construction which is efficiently and simply used with very little cleaning required.

Another object of the invention is to provide a broiler having a pair of heating elements mounted within a frame with a broiling space therebetween and with the elements adjustable toward and away from each other to provide the desired heat for broiling and wherein a heat reflector is associated with each of the elements to direct heat toward the broiling space with their being one reflector associated with each heating element and mounted for movement therewith and spaced from the element a proper distance to provide maximum efficiency while still not being sufficiently close to provide a fire hazard.

Another object of the invention is to provide a portable broiler having a hollow frame with a pair of side walls and a front wall, a pair of heating elements within said frame, means mounting the elements on the frame for movement relative to each other for suitable spacing to provide a broiling space therebetween, a pair of replaceable foil reflectors associated one with each of said heating elements and mounted a fixed distance therefrom and for movement therewith, and replaceable foil heat reflecting and insulating panels mounted adjacent the front and side walls to maintain the outside of said walls relatively cool.

Another object is to provide a broiler as defined in the preceding paragraph in which said reflectors and panels are removable from within the broiler frame for replacement of the foil, said panels comprise spaced apart layers of replaceable foil which are releasably attached to their frame, and having an arrangement in which a central fixed heating element is disposed in the broiler between said pair of elements and one of said reflectors may be mounted on one of said pair of heating elements to serve as a reflector for said fixed heating element.

Further objects and advantages will become apparent from the following detailed description taken in connection with the accompanying drawings in which:

FIG. 1 is a perspective view of the broiler with the removable top broken away to show the interior thereof;

FIG. 2 is a perspective view of a rack for holding meat, poultry or the like in said broiler;

FIG. 3 is a vertical section taken generally along the line 3—3 in FIG. 1 with the lower part of the broiler broken away;

FIG. 4 is a vertical section taken generally along the line 4—4 in FIG. 1;

FIG. 5 is a perspective view of a heat reflector useable in the broiler;

FIG. 6 is a perspective view of a side panel useable in the broiler;

FIG. 7 is a perspective view of a front panel useable in the broiler; and

FIG. 8 is a fragmentary vertical section similar to FIG. 4 showing an alternate form with a central fixed heating element.

While this invention is susceptible of embodiments in many different forms, there is shown in the drawings and will herein be described in detail an embodiment of the invention together with a modification thereof with the understanding that the present disclosure is to be considered as an exemplification of the principles of the invention and is not intended to limit the invention to the embodiment illustrated. The scope of the invention will be pointed out in the appended claims.

As shown in FIG. 1, the broiler is a portable unit having side walls indicated generally at 10 and 11, a front wall 12 and a rear wall 13. Each of the walls is formed of spaced apart rods 14 extending between upper and lower horizontal wall members. The upper and lower wall members for the wall 10 are indicated at 15 and 16. The broiler has legs 17, 18, 19 and 20 which support the broiler in an elevated position above a supporting surface and a pair of rods 21 and 22 extend between the legs 18 and 19 and 17 and 20, respectively, to provide a support for a drip pan 23.

A pair of heating elements 30 and 31, such as Calrod electric units, are mounted within the interior chamber of the frame, as shown in FIG. 4, and define therebetween a broiling space. Each of the heating elements 30 and 31 is generally coextensive with the height and depth of the frame, as shown in FIG. 3, to provide a broiling space substantially the same height and depth as the frame. The heating elements 30 and 31 are adjustable toward and away from each other to provide the desired spacing of these elements from the food to be broiled by means comprising upper and lower guide rails 32 and 33 extending across the back wall 13 of the frame. These guide rails are slotted to slidably receive a pair of plates 34 and 35 each suitably formed of asbestos or the like and each carrying one of the heating elements. Thus sliding movement of the plates 34 and 35 in the guide members 32 and 33 provides the necessary adjustment of the heating elements 30 and 31. The plates 34 and 35 also provide a mounting for a switch and junction box for connecting the heating elements to a source of electricity with this box for the plate 34 being shown at 36.

In order to obtain the maximum broiling effect from the heating elements 30 and 31, a heat reflector 40 is associated with each of these elements with the reflectors being identical and one of them being shown in detail in FIG. 5. Each reflector 40 is mounted for movement with its associated heating element and is spaced therefrom a predetermined distance to be sufficiently close to provide maximum efficiency while not being close enough to create a fire hazard. The reflectors 40 each embody a rod 41 formed into a rectangle about which foil is wrapped to provide spaced foil layers 42 and 43 forming an air space therebetween. The upper end of the rod 41 is provided with a hook portion 44 to rest upon a rod 45 as shown in FIGS. 3 and 4 which extends from front to rear of the frame generally at the highest level of the heating element 30 and is mounted on the adjusting plate 34. The heat reflector 40 associated with the heating element 31 is mounted on a similar support member 46 carried by the adjusting plate 35. These reflectors eliminate any tendency of the heating elements 30 and 31 to bake the food disposed therebetween and insure the broiling of the food. These reflectors embody easily replaceable components in that the foil layers 42 and 43 may be replaced when the surface thereof becomes carbonized merely by lifting a reflector 40 off its support 45 or 46 and withdrawing the reflector from the frame for replacement of the foil.

Additionally to increase the efficiency of the unit and to render it relatively cool on the exterior thereof a plurality of heat insulating and reflecting panels are mounted within the broiler. A side panel 50, as shown in FIG. 6, is associated with the side wall 11 and a second similar side panel 50 is associated with the side wall 10 while a front panel 51 shown in FIG. 7 is associated with the front wall 12. Each of the side panels 50 are the same and thus description of one is believed sufficient.

As shown in FIG. 6, the side panel comprises an upper panel support 52 and a lower panel support 53 in spaced apart relation and about which spaced layers 54 and 55 of disposable foil are wrapped. The foil layers 54 and 55 span the panel and provide an insulating air space between. The upper support member 52 has a pair of exposed ends shaped as hooks 56 and 57 to extend through the foil and engage either the top horizontal rod member 15 of the side wall 10 or the corresponding member of the side wall 11. The lower support member 53 has a pair of springs 58 and 59 attached to the ends thereof and extending through the foil with the springs being attachable to either the lower horizontal member 16 of the frame side wall 10 or the corresponding member of the side wall 11. With this construction the side panels are snugly held against the side walls of the broiler frame by the action of the springs 58 and 59 while the panels are still easily removable for replacement of the foil by release of the springs 58 and 59 and elevation of the panel from the frame. In addition to the air space provided between the foil layers 54 and 55 the heat transfer from the panel to the wall is a minimum since the engagement therebetween is on a tangent line with the rods of the side wall to minimize heat conduction.

The front panel 51 is generally similar to the side panels 50 with an upper support member 60 provided with a central U-shaped part to coincide with an opening in the frame front wall 12 and a lower support member 61. A pair of hooks 62 and 63 are on the upper member 60 and a pair of springs 64 and 65 on the lower member 61.

The front wall 12 of the broiler frame has a U-shaped upper member 66 to permit access to the broiling space between the heating elements 30 and 31 which with the open top of the frame permits easy entry of a rack indicated generally at 70 in FIG. 2. This rack is of a conventional nature having opposed jaws 71 and 72 hinged together by rings 73 and 74 and having a handle 75 held together by a loop 76. This rack has a hook 76 whereby the hook may engage a rod 77 extending across the top of the frame and with the handle 75 resting on the frame member 66 the food is supported properly for broiling.

As shown in the drawings, another panel 80 covered with foil is shaped to rest upon the top of the frame and substantially close off the frame interior.

An alternate embodiment is shown in FIG. 8. This is the same as the previously referred to embodiment but a central fixed heating element 90 is mounted on a plate 91 and disposed between the heating elements 30 and 31 whereby if only the heating elements 90 and 31 are being used one of the heat reflectors 40 normally associated with the heating element 30 may be supported directly by the latter element to thus function as a reflector for the heating element 90.

I claim:

1. A broiler comprising, an open top frame having front, rear and side walls each formed of spaced rods defining an interior chamber and having supporting legs, a pair of heating elements disposed in said chamber and substantially coextensive with the height and depth thereof, means for mounting said heating elements for adjustment toward and away from each other including guide members on said rear wall and a plate for each element slidable on said guide members, a reflector associated in spaced relation with each element for directing heat toward the other element and the broiling space between the elements comprising a reflector support mounted on the associated plate and extending toward the front wall at the top of the broiler and a reflector frame having disposable foil wrapped therearound loosely hung on the reflector support, a plurality of heat reflecting and insulating panels associated one with each of said side and front walls including spaced upper and lower panel supports and spaced apart disposable foil layers spanning said panel supports, said upper panel support having hooks to engage a horizontal frame rod at the top of the adjacent wall and coiled springs to engage a horizontal frame rod at the bottom of the adjacent wall to hold each panel snugly against the adjacent wall, means on said legs for supporting a drip pan beneath the broiling space, and means defining an opening in the front wall whereby meat, poultry or the like may be passed through the opening and the open top of the frame to the broiling space.

2. A broiler as defined in claim 1 in which a central fixed heating element is disposed between said pair of elements and one of said reflectors may be mounted on one of said pair of heating elements to serve as a reflector for said fixed heating element.

References Cited in the file of this patent

UNITED STATES PATENTS

| | | |
|---|---|---|
| 1,138,986 | Sisbower et al. | May 11, 1915 |
| 1,987,378 | Tansley | Jan. 8, 1935 |
| 2,124,837 | Triolo | July 26, 1938 |
| 2,851,575 | Walston | Sept. 9, 1958 |
| 2,893,307 | Rodriquez | July 7, 1959 |